(12) United States Patent  
Menssen

(10) Patent No.: US 8,657,903 B2
(45) Date of Patent: Feb. 25, 2014

(54) CYCLONE SEPARATOR

(71) Applicant: Mann+Hummel GmbH, Ludwigsburg (DE)

(72) Inventor: Joerg Menssen, Tamm (DE)

(73) Assignee: Mann + Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/646,910

(22) Filed: Oct. 8, 2012

(65) Prior Publication Data

US 2013/0031878 A1  Feb. 7, 2013

Related U.S. Application Data

(63) Continuation of application No. PCT/EP2011/055494, filed on Apr. 8, 2011.

(30) Foreign Application Priority Data

Apr. 8, 2010 (DE) .......................... 10 2010 014 278

(51) Int. Cl.
*B01D 45/12* (2006.01)
(52) U.S. Cl.
USPC .................. 55/345; 55/447; 55/456; 55/457; 55/337; 55/504; 55/498
(58) Field of Classification Search
USPC ............ 55/337, 504, 498, 447, 456–457, 345
See application file for complete search history.

(56) References Cited

U.S. PATENT DOCUMENTS 3,895,930 A * 7/1975 Campolong .................... 55/394
5,320,653 A   6/1994 Morgan et al.
5,403,367 A * 4/1995 De Villiers et al. ............. 55/320

FOREIGN PATENT DOCUMENTS

| DE | 6930999 U | 11/1969 |
| DE | 4417843 A1 | 11/1994 |
| EP | 0558091 | 9/1993 |
| GB | 594576 A | 11/1947 |
| GB | 1243547 A | 8/1971 |

OTHER PUBLICATIONS

German Office Action of priority DE 10 2010 014 278.6.
PCT search report of PCT/EP2011/055494.

* cited by examiner

*Primary Examiner* — Dung H Bui
(74) *Attorney, Agent, or Firm* — James Hasselbeck

(57) ABSTRACT

A cyclone separator (100; 100') including a first cyclone component (10; 10') having at least one substantially cylindrical cell pipe (12) including a guide device (14), a particle outlet (30) for separated particles, and a second cyclone component (20; 20') including at least one immersion pipe (22). The immersion pipe (22) is received in the cell pipe (12), at the outflow side end and is connected at least partially to the outflow side end of the cell pipe (12) and includes a central outlet (24) for the purified gas stream.

9 Claims, 12 Drawing Sheets

CYCLONE SEPARATOR

CROSS REFERENCE TO RELATED APPLICATIONS

This application is a US Bypass Continuation of International Patent Application no. PCT/EP2011/055494, filed Apr. 8, 2011 designating the United States of America, the entire disclosure of which is incorporated herein by reference. Priority is claimed based on German patent application no. 10 2010 014 278.6, filed Apr. 8, 2010.

TECHNICAL FIELD

The invention relates to a cyclone separator, in particular a cyclone preseparator for an air filter of an internal combustion engine, for example, a multi-cell cyclone.

BACKGROUND OF THE INVENTION

An air filter that is provided with a preseparator embodied as a multi-cell cyclone is, for example, disclosed in the publication DE 298 19 335 U1 as well as in the publication DE 10 2008 011 186 A1. Moreover, in the publication DE 20 2006 015 231 U1, a cyclone separator according to the preamble of claim 1 is disclosed. According to the aforementioned prior art, the first and the second cyclone components are two separate components of the housing of the cyclone. These two housing components are connected to each other at their respective outflow-side ends. For example, the two cyclone components, as disclosed in the publication DE 102 35 743 A1, can be connected to each other by a snap connection.

In case of these known cyclone preseparators, it is however important that the two housing components have exact fit relative to each other because otherwise the housing would be leaking, which greatly reduces the performance of the cyclone preseparator. In order to achieve the desired preseparation degree, only minimal tolerances may be generated when manufacturing the two cyclone components.

SUMMARY OF THE INVENTION

An object of the invention is to further develop a cyclone separator of the aforementioned kind in such a way that in the manufacture of the first and second cyclone components greater manufacturing tolerances are permissible without this affecting negatively the performance of the cyclone separator.

Accordingly, the present invention is based on at least one sealing element that is arranged in the connecting area of the outflow-side end of the cell pipe and the outflow-side terminal area of the immersion pipe and that connects seal-tightly the cell pipe and the immersion pipe.

According to an advantageous embodiment of the present invention, the sealing element is arranged in the connecting area between the outflow-side end of the cell pipe and an immersion pipe plateau arranged at the outflow-side terminal area of the immersion pipe and extending substantially radially to the axial direction of the immersion pipe. In this way, this seal-tightness between the cell pipe and the immersion pipe plateau is increased. The seal-tightness between cell pipe and immersion pipe plateau plays an important role in regard to the performance of the cyclone separator.

For a targeted deflection of the particles separated by rotation to the particle outlet, the cell pipe can have at the outflow-side end a cutout whose outflow-side end is positioned at a spacing from the outflow-side terminal area of the immersion pipe. In this embodiment, the sealing element can extend circumferentially about to the entire circumference of the area of the outflow-side end of the cell pipe and/or the entire circumference of the area of the outflow-side terminal area of the immersion pipe. Alternatively however, the sealing element can also be arranged exclusively on the area of the cell pipe that is connected to the outflow-side terminal area of the immersion pipe and/or exclusively on the area of the immersion pipe that is connected to the outflow-side end of the cell pipe.

Advantageously, the cyclone is configured as a multi-cell cyclone. In a multi-cell cyclone, the first cyclone component has a plurality of cell pipes and the second cyclone component has a plurality of immersion pipes. Preferably, a sealing element of the aforementioned kind is arranged on at least one area of the outflow-side ends of the cell pipes, respectively, and/or on at least one area of the outflow-side terminal areas of the immersion pipes, respectively.

The sealing element can be releasably arranged on at least one area of the outflow-side end of the cell pipe and/or at least at one area of the outflow-side terminal area of the immersion pipe. This has the advantage that the sealing element can be exchanged in a simple way.

In a multi-cell cyclone, the respective sealing elements can be connected to each other, for example, like a mat. This facilitates attachment and optionally exchange of the sealing elements.

However, it is also possible to injection-mold the sealing element fixedly on at least one area of the outflow-side end of the cell pipe and/or on at least one area of the outflow-side terminal area of the immersion pipe. Injection molding of the sealing element is an especially efficient manufacturing process for the sealing element.

The sealing element is preferably substantially formed of at least one thermoplastic elastomer material.

The cyclone separator according to the invention is particularly suitable as a preseparator for a two-stage separator, for example, for an air filter of an internal combustion engine. For use in a two-stage separator, the cyclone separator is embodied as a preseparator wherein the outlet of the immersion pipe is connected to the raw-side inlet of a filter housing in which a primary filter element is housed.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
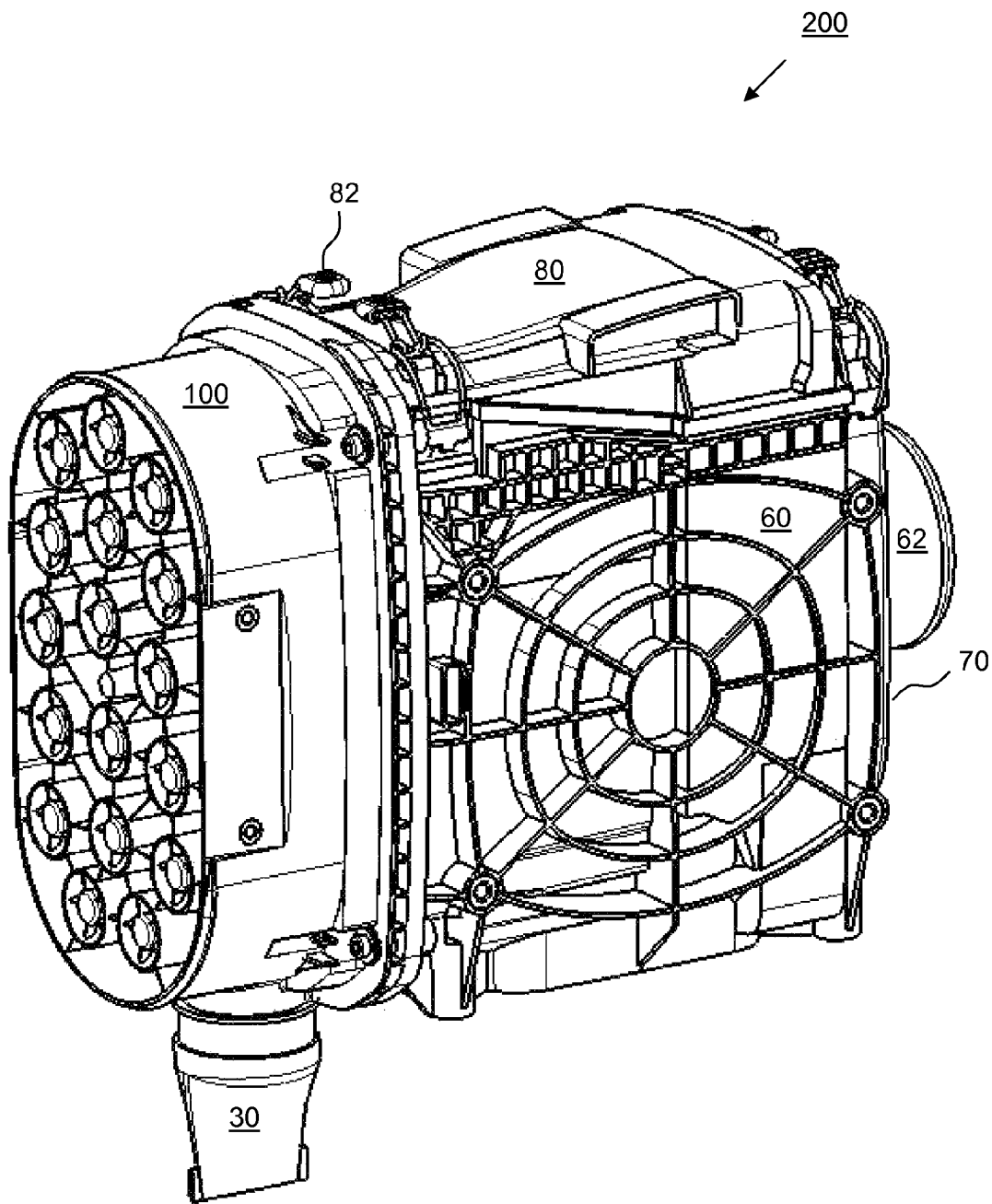
FIG. 1 is a perspective illustration a filter device of a first embodiment for a cyclone separator according to the present invention, wherein the sealing element is arranged on the first cyclone component.

Same or similar configurations, elements or features are provided with identical reference characters in FIGS. 1 through 12. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to cyclone separator. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

In order to avoid superfluous repetitions, the following explanations with respect to configurations, features, and advantages of the present invention (inasmuch as nothing differently is indicated) apply to the cyclone separator 100 illustrated in FIGS. 1 to 7 as well as to the cyclone separator 100' illustrated in the FIGS. 8 to 12.

The filter device 200 illustrated in FIG. 1 is an air filter for an internal combustion engine, comprised of a filter housing 60, in which a main filter element is received, a cyclone preseparator 100 as well as a downstream secondary element 70. The filter housing 60 has at its circumferential side an opening that is covered by a lockable cover 80 that is detachably arranged by means of closure elements 82. Through this opening in the wall surface of the filter housing, the main filter element and expediently also the secondary filter element 70 can be inserted into or removed from the receiving space within the filter housing 60 in radial direction or transverse to the axial direction 50 (compare FIGS. 4, 6, 11) of the two cyclone components 10, 20. The filter housing 60 has a raw-side inlet and a clean-side outlet 62 for media to be filtered.

The cyclone preseparator 100 is arranged in the area of the inlet of the filter housing 60. In the cyclone preseparator 100, the dirt particles are transported from the axially supplied air by centrifugal force in a rotating airstream outwardly and separated. By means of a particle outlet 30 that is oriented downwardly, the dirt particles that have been separated in the cyclone preseparator 100 can be removed. The cyclone preseparator 100 is embodied as a separate component that is connected to the filter housing 60. The fluid that has been prefiltered in the cyclone preseparator 100 is supplied axially to the inflow side of the main filter element provided at the end face. Cyclone preseparator 100, main filter element 60, and secondary element 70 can be positioned in axial direction in a row behind each other and can be flowed through in axial direction, in particular without deflection of the combustion air to be purified.

For producing the rotating air stream, the cyclone preseparator 100 has a first cyclone component 10, i.e., a cyclone top part that is screw-connected to the filter housing, and a second cyclone component 20, i.e., a cyclone bottom part that is clamped between the cyclone top part 10 and the filter housing 60. The cyclone top part 10 of the cyclone preseparator 100 embodied as a multi-cell cyclone has a plurality of cell pipes 12 and the cyclone bottom part is embodied as an immersion pipe plate with a plurality of immersion pipes 22.

Figure 2:
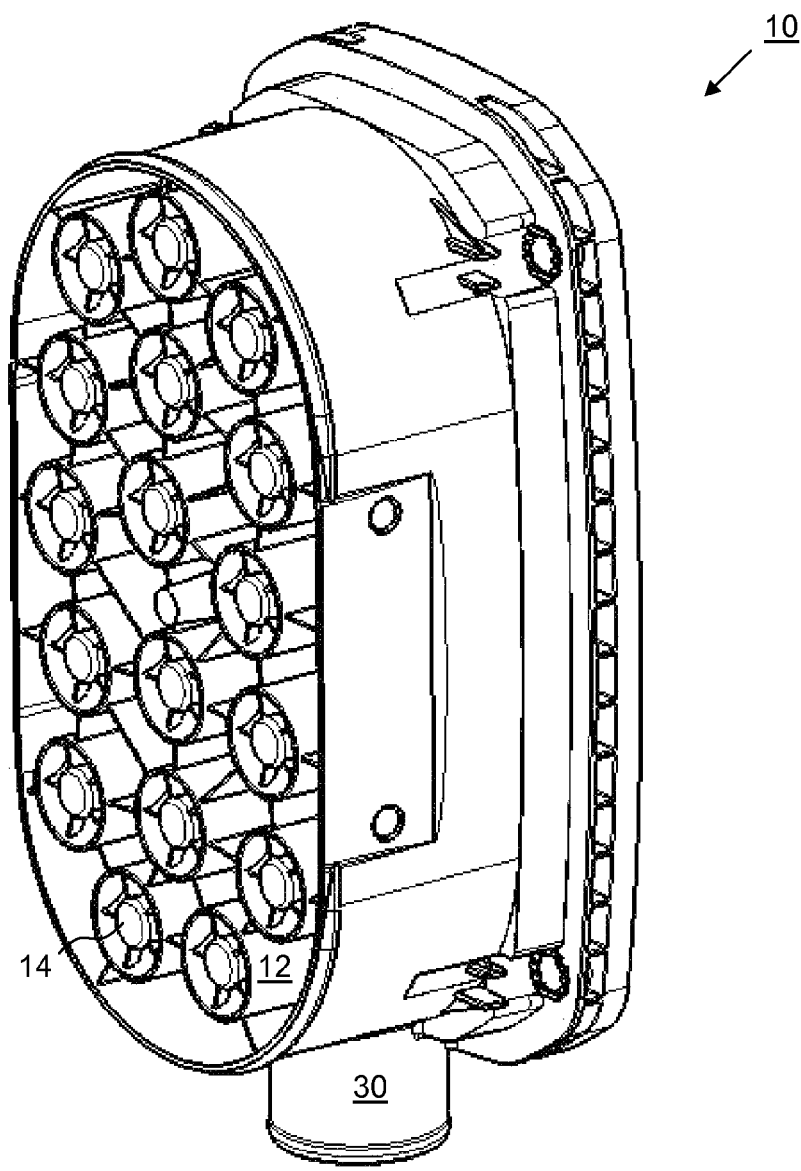
FIG. 2 is a front view of the first cyclone component of the cyclone separator of FIG. 1.
Figure 3:
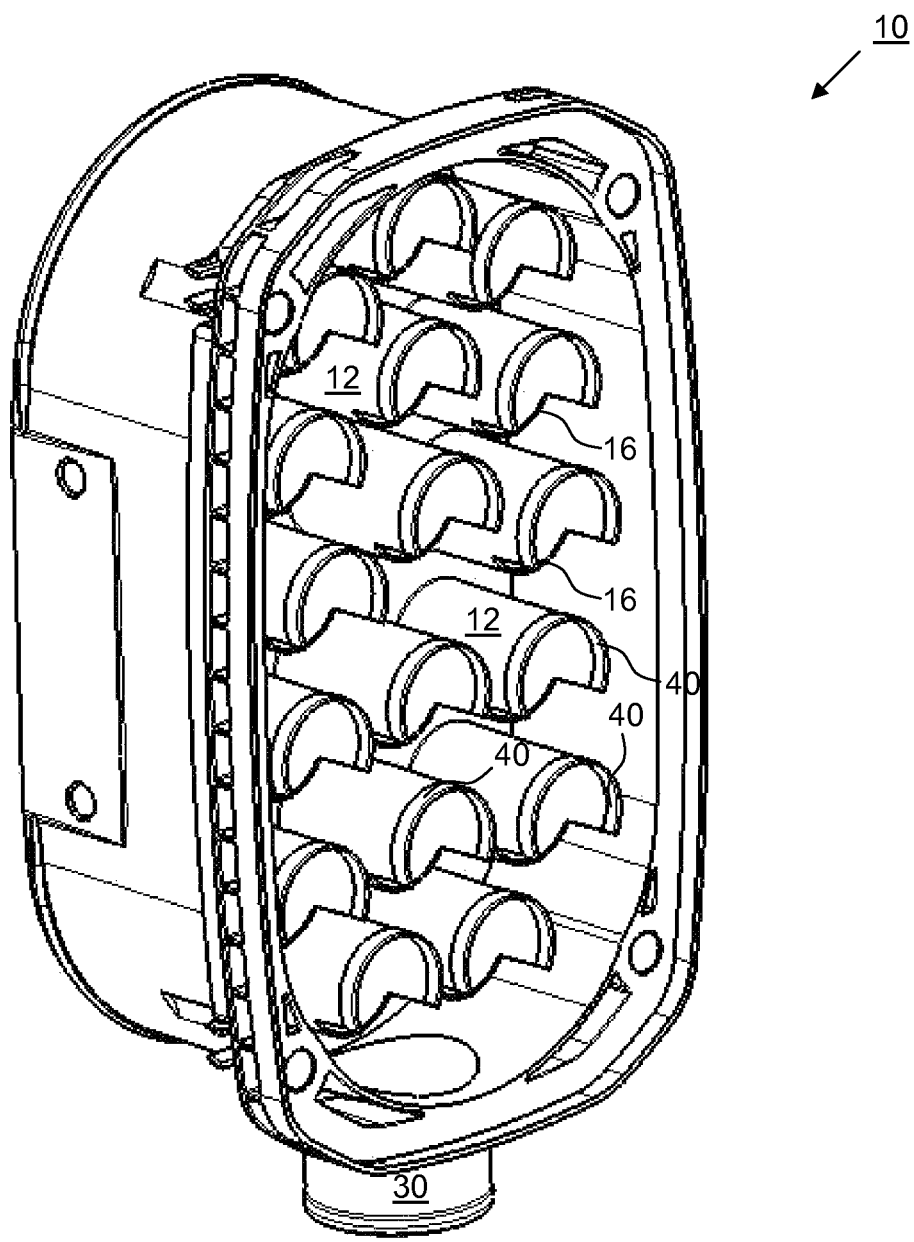
FIG. 3 is a rear view of the first cyclone component of the cyclone separator of FIG. 1.
Figure 5:
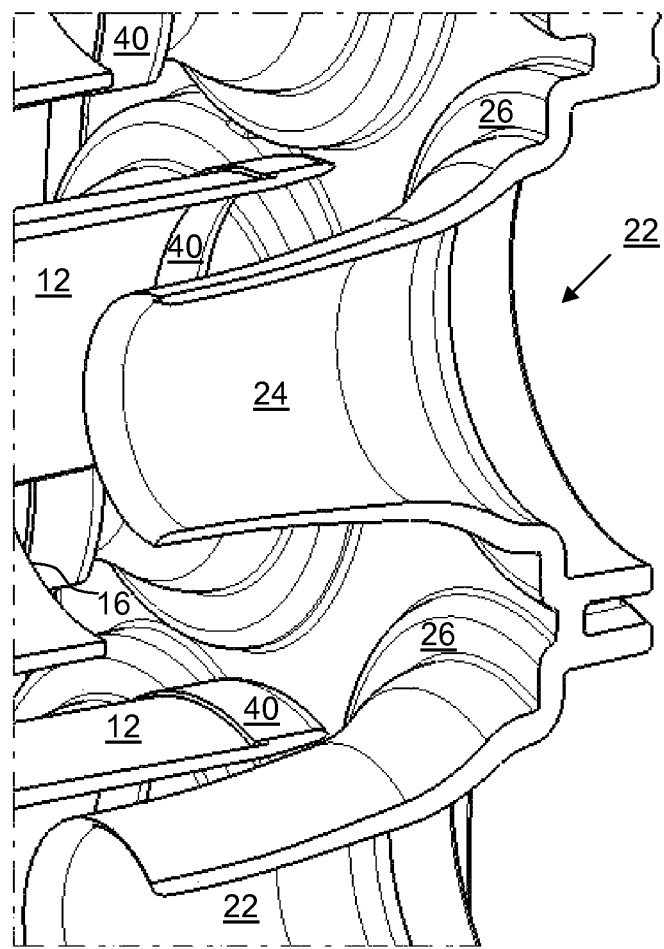
FIG. 5 is a detail view of the connecting area of the first and the second cyclone components of FIG. 4.

FIG. 2 shows a front view and FIG. 3 a rear view of the cyclone top part 10. On the outflow-side end of the cell pipes 12, a sealing element 40 is arranged, respectively, and is embodied as a sealing lip. This sealing lip 40 is embodied to connect seal-tightly the cell pipes 12 and the immersion pipes 22 to each other. As can be seen in FIGS. 3 and 5, the sealing lip 40 can circumferentially extend about a partial area of the outflow-side end of the respective cell pipes 12. The sealing lips 40 that are illustrated in FIGS. 3 and 5 are of a part-circular shape, in particular approximately corresponding to ⅔ of a circle or ¾ of a circle.

For a targeted discharge of the particles that have been separated by rotation to the particle outlet 30, the cell pipes 12 each have a cutout at an area of its outflow-side end that is facing the particle outlet 30. The terminal area 16 of this cutout is not sealed in the illustrated embodiment and is not in contact with the outflow-side end of the immersion pipe 22.

Figure 4:
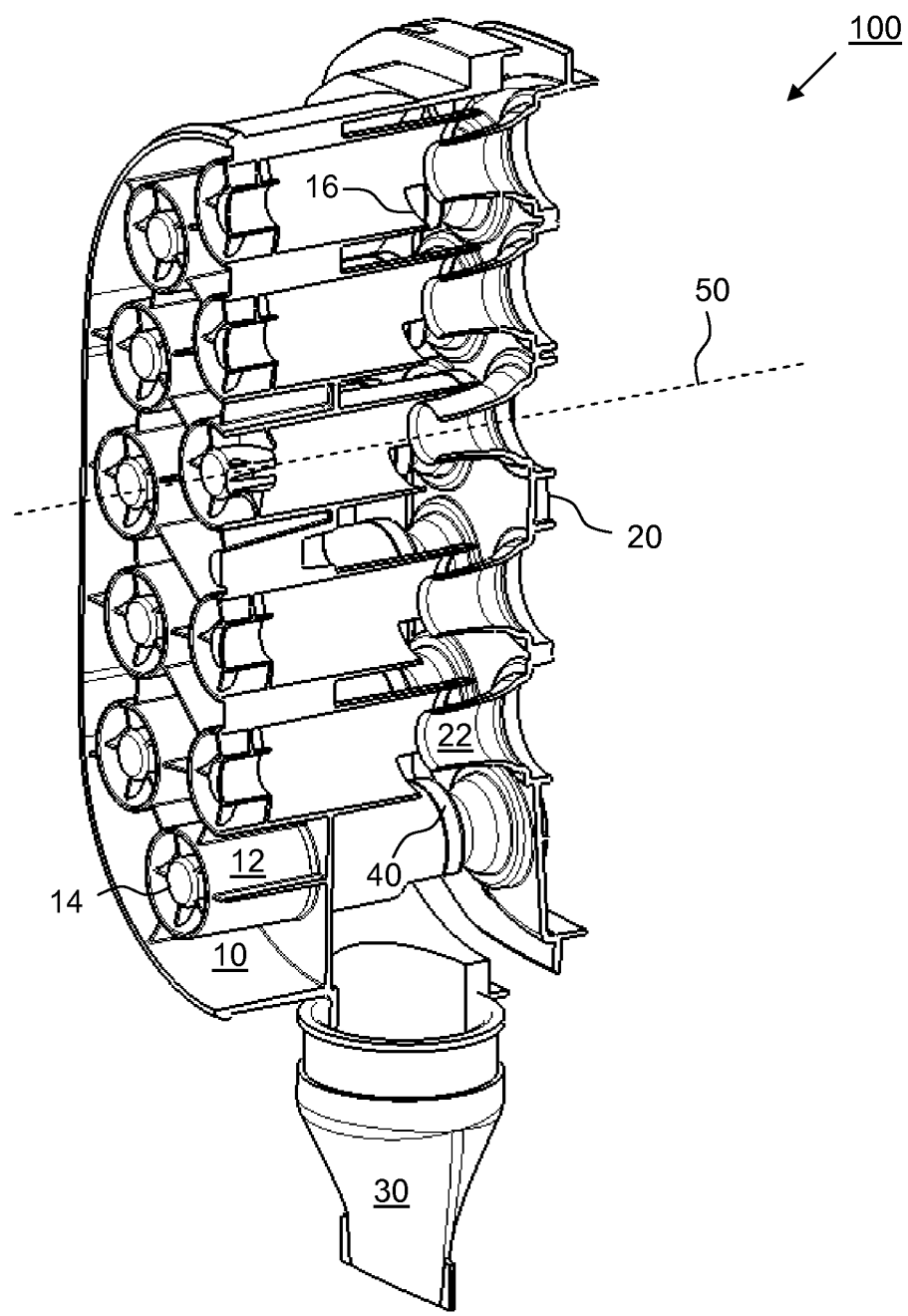
FIG. 4 depicts the first cyclone component of the cyclone separator of FIG. 1 upon connection with the correlated second cyclone component.

FIGS. 4 and 5 show the cyclone separator 100 of FIG. 1 in exploded illustration. In particular FIG. 5 shows that after assembly of the cyclone housing, i.e., after connecting the cyclone top part 10 and the cyclone bottom part 20, the sealing lips 40 that are arranged on the cyclone top part are resting on a plateau 26 of the immersion pipe 22 that extends in radial direction.

Figure 6:
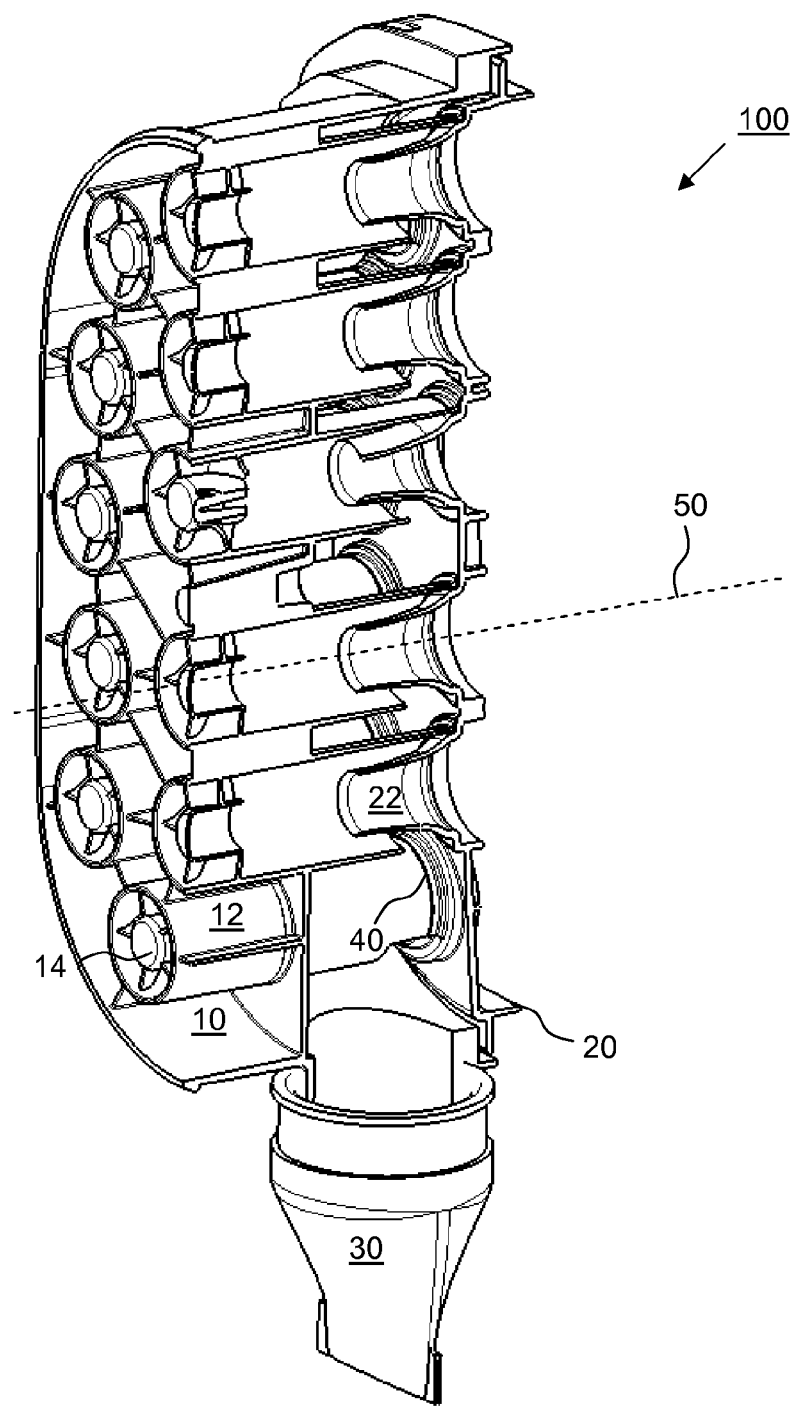
FIG. 6 depicts the cyclone separator of FIG. 4 in the assembled state.
Figure 7:
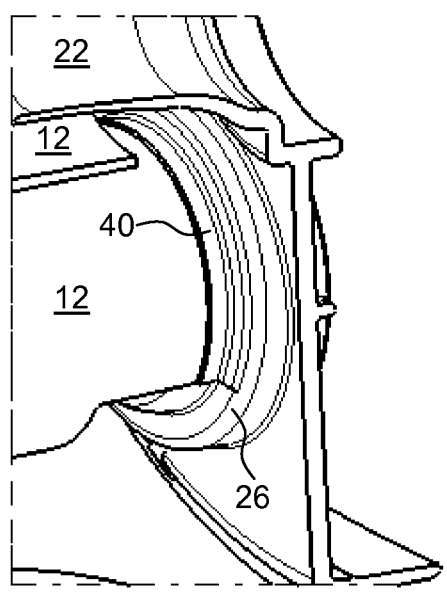
FIG. 7 is a detail view of the connecting area of the first and the second cyclone components of the cyclone separator of FIG. 4 in the assembled state.

FIGS. 6 and 7 show the cyclone separator 100 of FIG. 1 in the assembled or mounted state. The sealing lips 40 are compressed tightly with the outflow-side ends of the cell pipes 12 and the outflow-side terminal areas of the immersion pipes 22.

In the second embodiment illustrated in FIGS. 8 through 12 of the present invention, the sealing elements 40' are arranged on the cyclone bottom part 20', more precisely, on the respective immersion pipe plateau 26, respectively. In this connection, the sealing elements 40' surround the immersion pipes 22.

Figure 8:
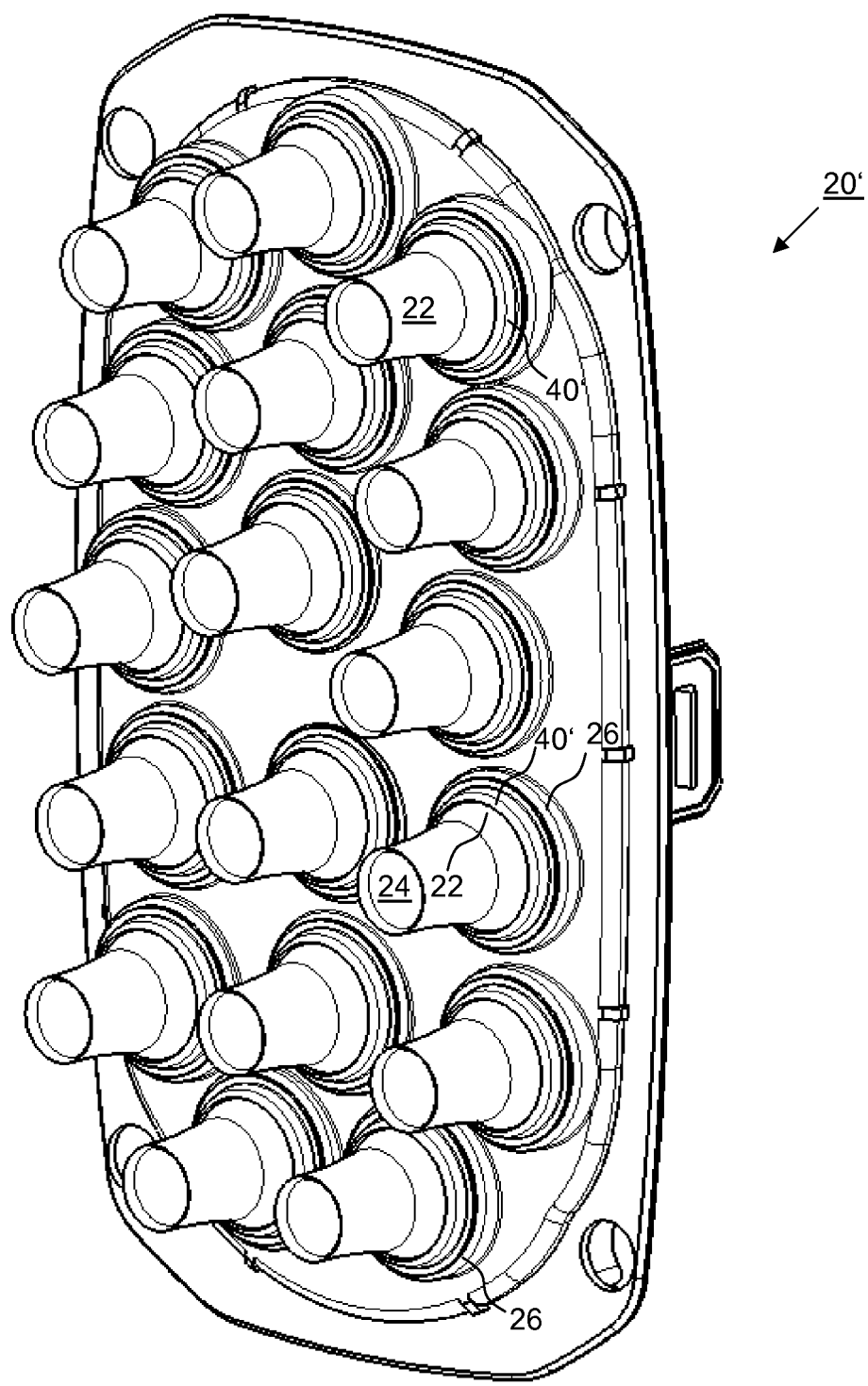
FIG. 8 is a front view of the second cyclone component of a second embodiment for a cyclone separator according to the present invention, wherein the sealing element is arranged on the second cyclone component.

As illustrated in FIG. 8, the immersion pipes 22 widen conically in the flow direction of the gas stream. For sealing a connecting area of the outflow-side ends of the respective cell pipe 12 and of the respective immersion pipe 22 in the direction of axis 50 of the cell pipe 12 or the immersion pipe 22, the sealing elements 40' have at least one axial sealing surface 42. Moreover, the sealing elements 40' have at least one radial sealing surface 44 for sealing the connecting area of the outflow-side ends of the respective cell pipe 12 and of the respective immersion pipe 22 in the direction of the radius of the cell pipe 12 or the immersion pipe 22 (compare FIG. 12).

Figure 9:
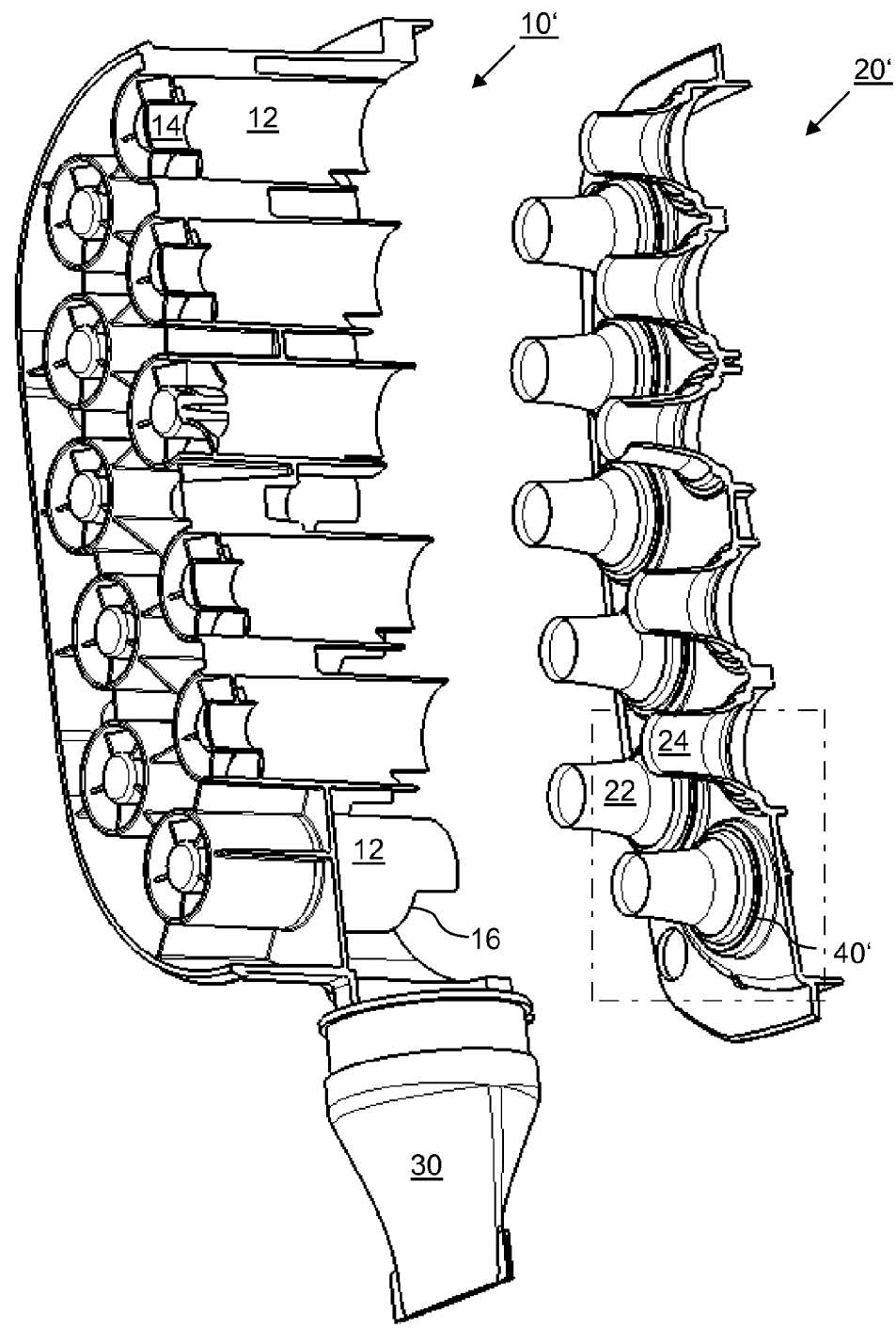
FIG. 9 depicts the second cyclone component of the cyclone separator of FIG. 8 upon connection with a first cyclone component.
Figure 10:
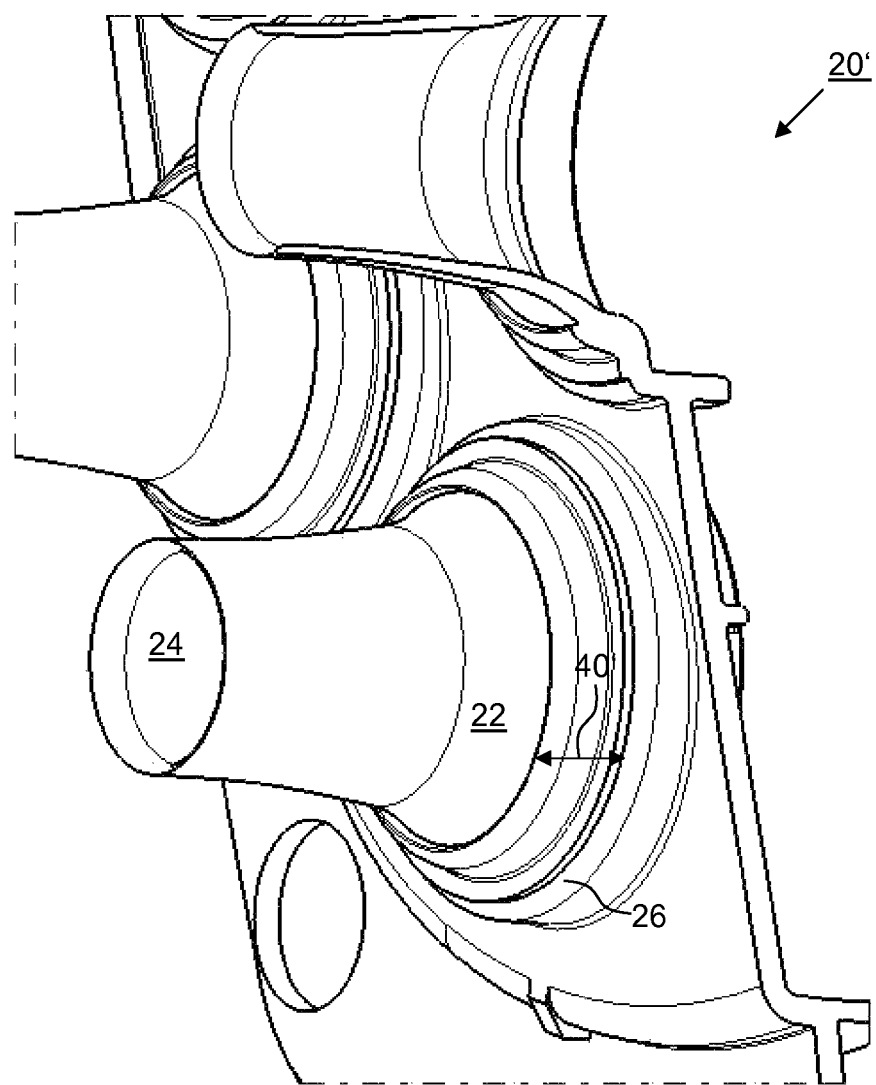
FIG. 10 is a detail view of the connecting area of the second cyclone component of FIG. 9.
Figure 11:
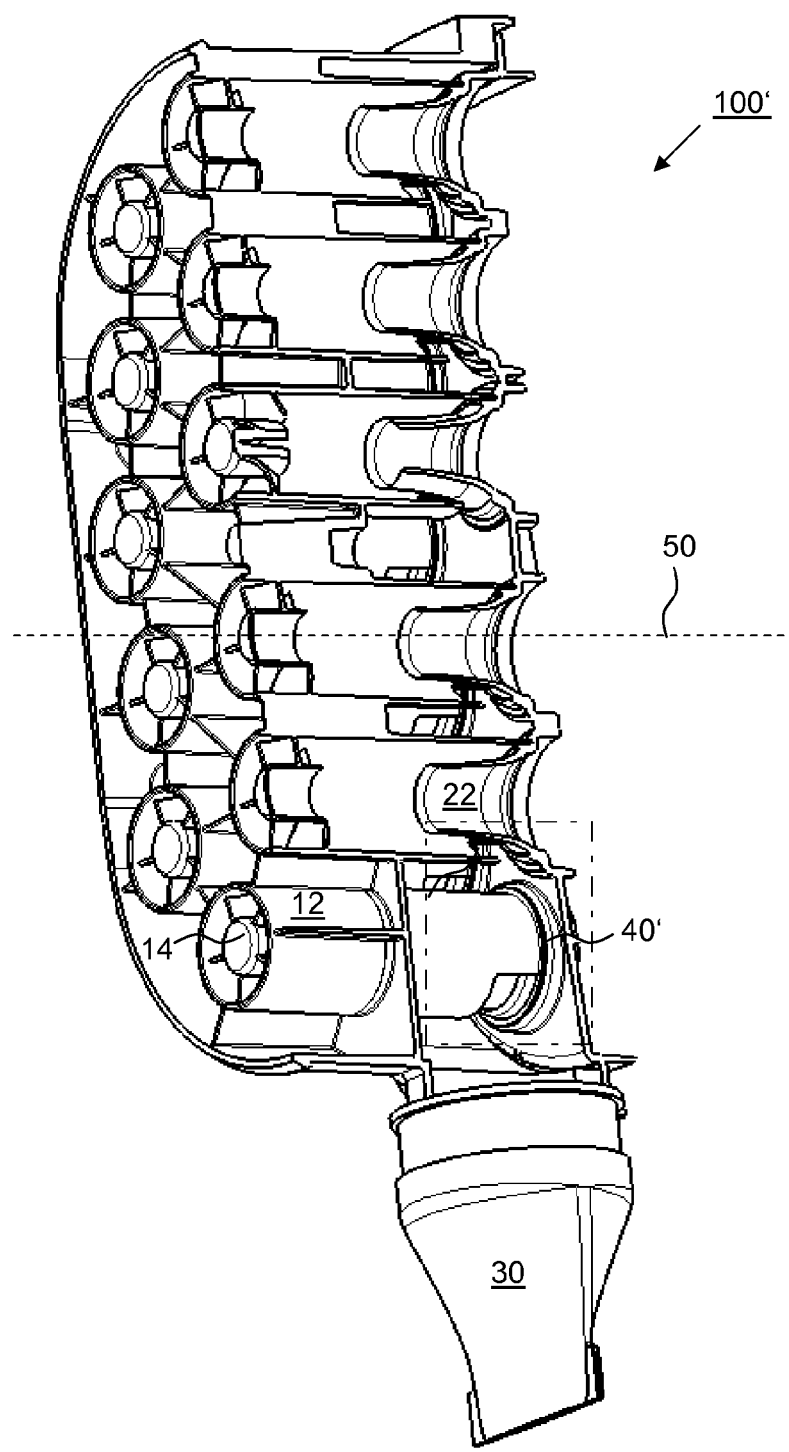
FIG. 11 depicts the cyclone separator of FIG. 9 in the assembled state.
Figure 12:
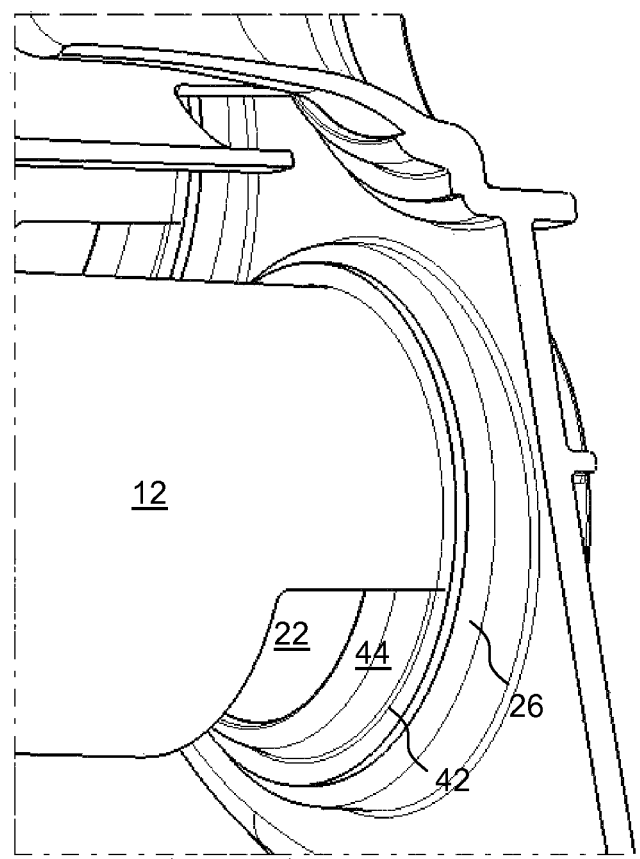
FIG. 12 is a detail view of the connecting area of the first and the second cyclone components of the cyclone separator of FIG. 9 in the assembled state.

In FIGS. 9 and 10, the cyclone preseparator 100' is shown in exploded illustration. The axial-radial sealing surfaces 42, 44 are resting on the immersion pipe plateau 26. The FIGS. 11 and 12 show the cyclone bottom part 20' with the axial-radial sealing surfaces 42, 44 in the mounted state wherein the sealing surfaces 42, 44 are compressed with the cell pipes 12 and the immersion pipes 22.

By means of the afore described sealing elements 40, 40', the seal-tightness of the two components 10, 10', 20, 20' of the cyclone separator 100, 100' is reliably ensured. Moreover, in regard to the manufacture of the two cyclone components 10, 10', 20, 20', greater manufacturing tolerances are permissible without the preseparation degree being affected greatly.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A cyclone separator for separating liquid and/or solid particles from a gas stream, comprising:
a first cyclone component with at least one substantially cylindrically embodied cell pipe that includes a guide device by means of which the gas stream is caused to rotate for separating the particles;
a particle outlet for discharging the separated particles, and
a second cyclone component arranged downstream in the flow direction of the gas stream and including at least one immersion pipe,
wherein the immersion pipe is received in the cell pipe, is connected at its outflow-side end, viewed in the flow direction of the gas stream, at least partially with the outflow-side end of the cell pipe, viewed in the flow direction of the gas stream, and has a central outlet for discharging the purified gas stream;
wherein in a connecting area of the outflow-side end of the cell pipe and of the outflow-side terminal area of the immersion pipe at least one sealing element is arranged that connects the cell pipe and the immersion pipe seal-tightly with each other,
wherein the sealing element is substantially formed of at least one thermoplastic elastomer or rubber.

2. The cyclone separator according to claim 1, wherein the immersion pipe includes at its outflow-side end an immersion pipe plateau that extends substantially radially relative to an axial direction of the immersion pipe; wherein the sealing element seal-tightly connects at least one area of the outflow-side end of the cell pipe with the immersion pipe plateau.

3. The cyclone separator according to claim 2, wherein the sealing element sealing the connecting area of the cell pipe and of the immersion pipe has at least one axial sealing surface extending in the direction of the axis of the cell pipe or in the direction of the axis of the immersion pipe or the sealing element sealing the connecting area of the outflow-side end of the cell pipe and of the outflow-side terminal area of the immersion pipe has at least one radial sealing surface extending in the direction of the radius of the cell pipe or in the direction of the radius of the immersion pipe.

4. The cyclone preseparator according to claim 1, wherein the sealing element is releasably arranged on at least one area of:
the outflow-side end of the cell pipe or
the outflow-side terminal area of the immersion pipe.

5. The cyclone separator according to claim 1, wherein the sealing element is injection-molded to at least one area of:
the outflow-side end of the cell pipe or
the outflow-side terminal area of the immersion pipe, in particular on at least one area of the immersion pipe plateau.

6. The cyclone separator according to claim 1, wherein the cyclone separator is embodied as a multi-cell cyclone; wherein the first cyclone component has a plurality of cell pipes;
wherein the second cyclone component has a plurality of immersion pipes; and
wherein the sealing element is arranged on each cell pipe or on each immersion pipe.

7. The cyclone separator according to claim 6, wherein the sealing elements on each cell pipe or each immersion pipe of said multi-cell cyclone are connected to each other like a mat, said connection facilitating exchange of the sealing elements.

8. The cyclone separator according to claim 1, wherein the cell pipe, for a targeted discharge of the particles that are separated by rotation to the particle outlet, includes at least one cutout at the outflow-side end;
wherein the outflow-side end (16) of this cutout is arranged at a spacing to the outflow-side terminal area of the immersion pipe (22).

9. The cyclone separator according to claim 1, wherein the cyclone separator is embodied as a preseparator; and
wherein the central outlet of the immersion pipe is connected to a raw-side inlet of a filter housing in which a primary filter element is received.

* * * * *